(12) United States Patent
Chen

(10) Patent No.: US 6,236,187 B1
(45) Date of Patent: May 22, 2001

(54) PLUG-IN CHARGING BATTERY MODULE

(76) Inventor: Tsung-Ming Chen, No. 11, Lane 33, Sec. 1, Chien-Kuo N. Rd., Taipei (TW)

( * ) Notice: Subject to any disclaimer, the term of this patent is extended or adjusted under 35 U.S.C. 154(b) by 0 days.

(21) Appl. No.: 09/669,845

(22) Filed: Sep. 27, 2000

(51) Int. Cl.[7] .................................................. H02J 7/00
(52) U.S. Cl. ........................... 320/113; D13/107; 320/107
(58) Field of Search ................................... 320/107, 110, 320/112, 113; D13/103, 107

(56) References Cited

U.S. PATENT DOCUMENTS

| | | | |
|---|---|---|---|
| 5,457,376 | * 10/1995 | Chong et al. ........................ | 320/107 |
| 5,668,462 | * 9/1997 | Jansson et al. ..................... | 320/110 |
| 5,883,494 | * 3/1999 | Kobayashi et al. ................. | 320/115 |
| 5,920,178 | * 7/1999 | Robertson, Jr. et al. ............ | 320/114 |
| 5,949,214 | * 9/1999 | Broussard et al. .................. | 320/107 |

* cited by examiner

Primary Examiner—Edward H. Tso
Assistant Examiner—Gregory J. Toatley, Jr.
(74) Attorney, Agent, or Firm—Bacon & Thomas, PLLC

(57) ABSTRACT

A plug-in charging battery module being arranged at the external portion of a portable electronic mainframe is disclosed. The plug-in charging battery module comprises a battery cover arranged on a battery seat and a plug-in power source seat arranged on the battery cover. By the aforesaid construction, the portable electronic mainframe can be charged and used at the same time. Moreover, as being charged, no battery is necessary to be detached; therefore, the use and carrying of the electronic mainframe are convenient.

6 Claims, 4 Drawing Sheets

PLUG-IN CHARGING BATTERY MODULE

BACKGROUND OF THE INVENTION

The present invention relates to a plug-in charging battery module, in which the portable electronic mainframe can be charged and used at the same time. Moreover, as being charged, no battery is necessary to be detached; therefore, the use and carrying of the electronic mainframe are convenient.

The prior art portable electronic products (for example, personal digital assistant, notebook, or palm type electronic player) can be carried out everywhere. In general, these products are charged by an un-rechargeable or rechargeable battery, or by battery cells with large power storage ability as a power supply of these electronic products. However, it is troubled that even the power capacities of these batteries or battery cells are increased largely, the user still feels that power is insufficient and can not know the timing of power exhaustion.

Moreover, if an user is necessary to charge a chargeable battery, in general, the battery must be taken out and then the electronic device is charged by a charger, or a transformer is inserted into the device for charging. If a user go out so that the electronic device can not be charged again, in general, the user carry with more batteries or cells for resolving the aforesaid problem. However, the general uncharged battery can not be used again and must be deserted as power is exhausted, and thus, a problem of environment protection will be induced. However, if the user needs to go out frequently, this problem induces a great trouble. Furthermore, these extra buckling batteries occupy a large space. Therefore, the use of the portable electronic device is reduced greatly.

However, the aforesaid problem is induced from the sake of deficiency of power source. In fact, in many places, the user may acquire a power source easily. Therefore, if the electronic device may effectively use the power source, then the problem of power insufficiency can be resolved.

For example, the igniter in car is a good power source as the user is driving. Another, if the user is at an office, the power can also be acquired easily. Therefore, how to convert and use the power in various environments is a problem to be eagerly resolved.

SUMMARY OF THE INVENTION

Accordingly, the primary object of the present invention is to provide a plug-in charging battery module, in which the portable electronic mainframe can be charged and used at the same time. Moreover, as being charged, no battery is necessary to be detached; therefore, the use and carrying of the electronic mainframe are convenient.

Another object of the present invention is to provide a plug-in charging battery module. The plug-in charging battery module comprises a battery cover arranged on a battery seat vand a plug-in power source seat arranged on the battery cover. Consequently, a plug-in charging battery module is formed.

BRIEF DESCRIPTION OF THE DRAWINGS

Embodiments of the present invention will hereinafter be described, by way of example, with reference to the accompanying drawings, in which.

DETAILED DESCRIPTION OF THE PREFERRED EMBODIMENTS

Figure 1:
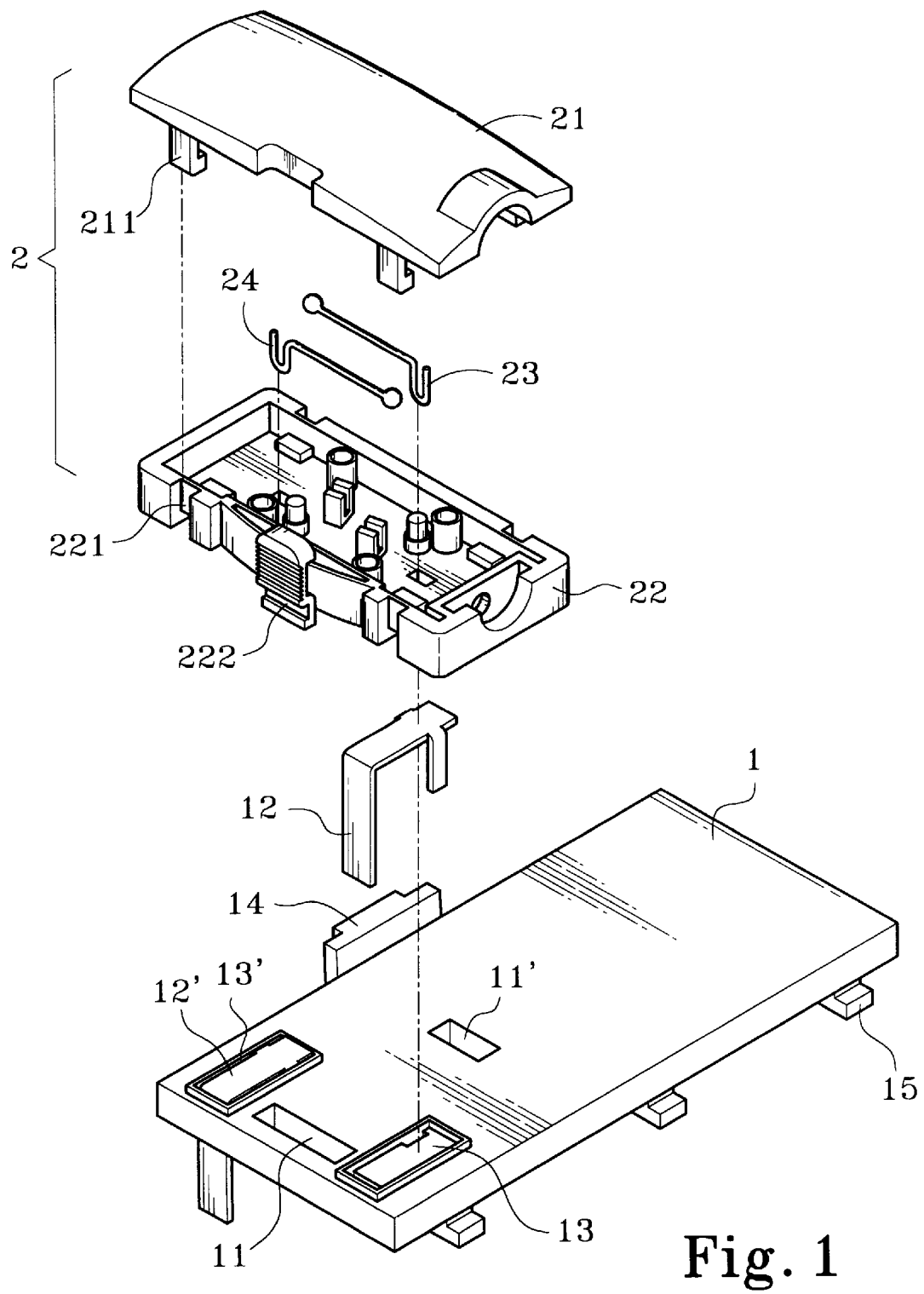
FIG. 1 is a schematic perspective view of the present invention.
Figure 2:
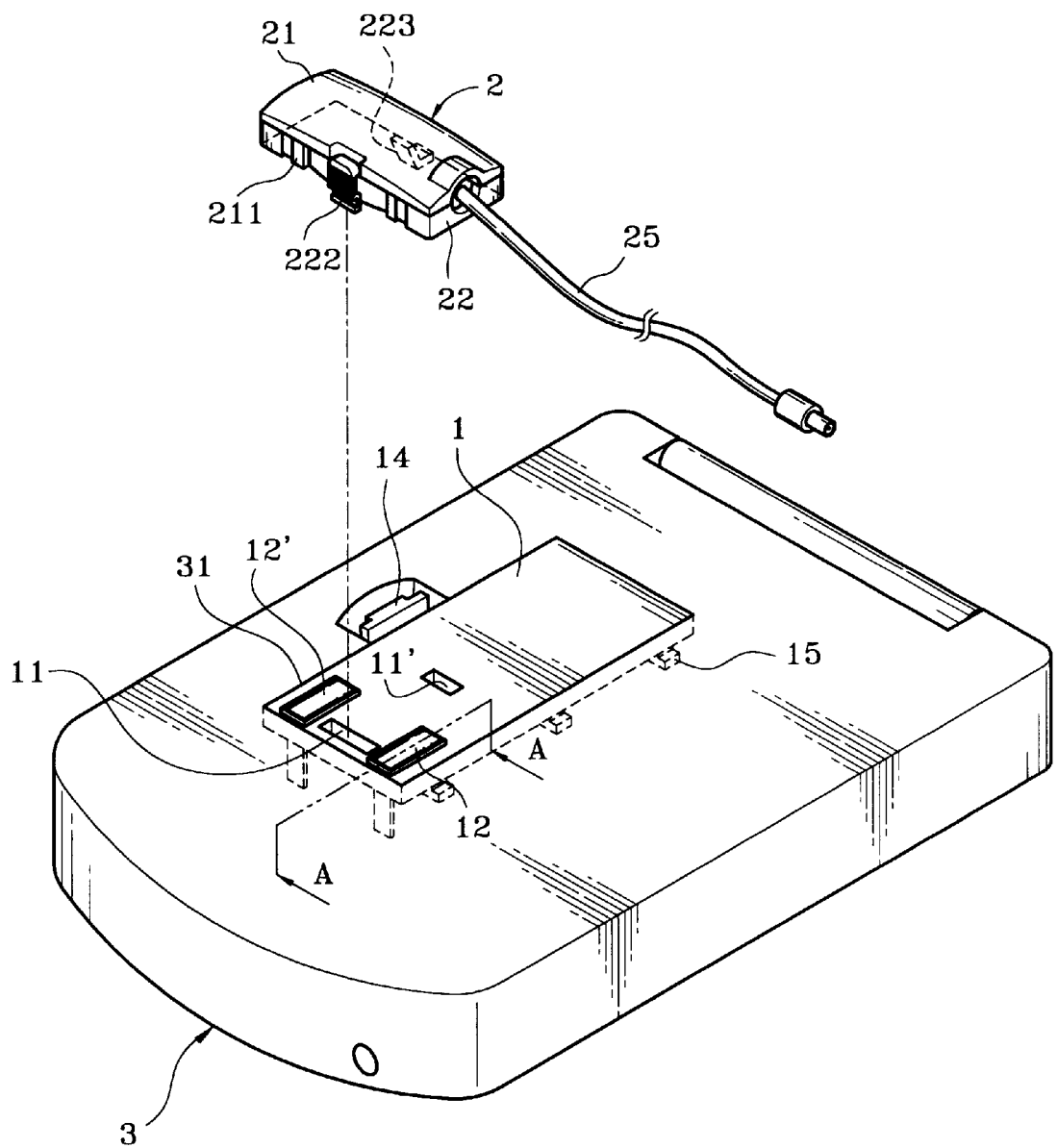
FIG. 2 is an assembled schematic view showing the use of the present invention.

With reference to FIGS. 1 and 2, the exploded perspective view and schematic view of the plug-in charging battery module of the present invention are illustrated. The plug-in charging battery module of the present invention is arranged at the external portion of a battery seat 31 of a portable electronic mainframe 3 (for example, a PDA, a notebook, or a palm type electronic player). The plug-in charging battery module of the present invention has the following components.

A battery cover 1 is installed with a plurality of buckling holes 11 and 11' and receiving grooves 13 and 13' with elastomers 12 and 12'. A plurality of buckling portions 14 and 15 may be installed at the periphery of the battery cover 1, which is arranged at the outer side of the battery seat 31.

A plug-in power source seat 2 is formed by an upper cover 21 and a lower cover 22, and installed with two power output joints 23 and 24'. A plurality of buckling portions 211 capable of being coupled to the slot 221 at the periphery of the lower cover 22. A power connecting wire 25 is installed in the plug-in power source seat 2 for being connected to the external power. Electronic element, such as a transformer and a rectifier, can be added to the connection between the power connecting wire 25 and the external power. Furthermore, the lower cover 21 is installed with a plurality of buckling portions 222 and 223, which are arranged on the buckling hole 22 of the battery cover 1.

By the aforesaid construction, the portable electronic mainframe 3 can be charged and used at the same time. Moreover, as being charged, no battery is necessary to be detached. Therefore, the use and carrying of the electronic mainframe are convenient.

Figure 3:
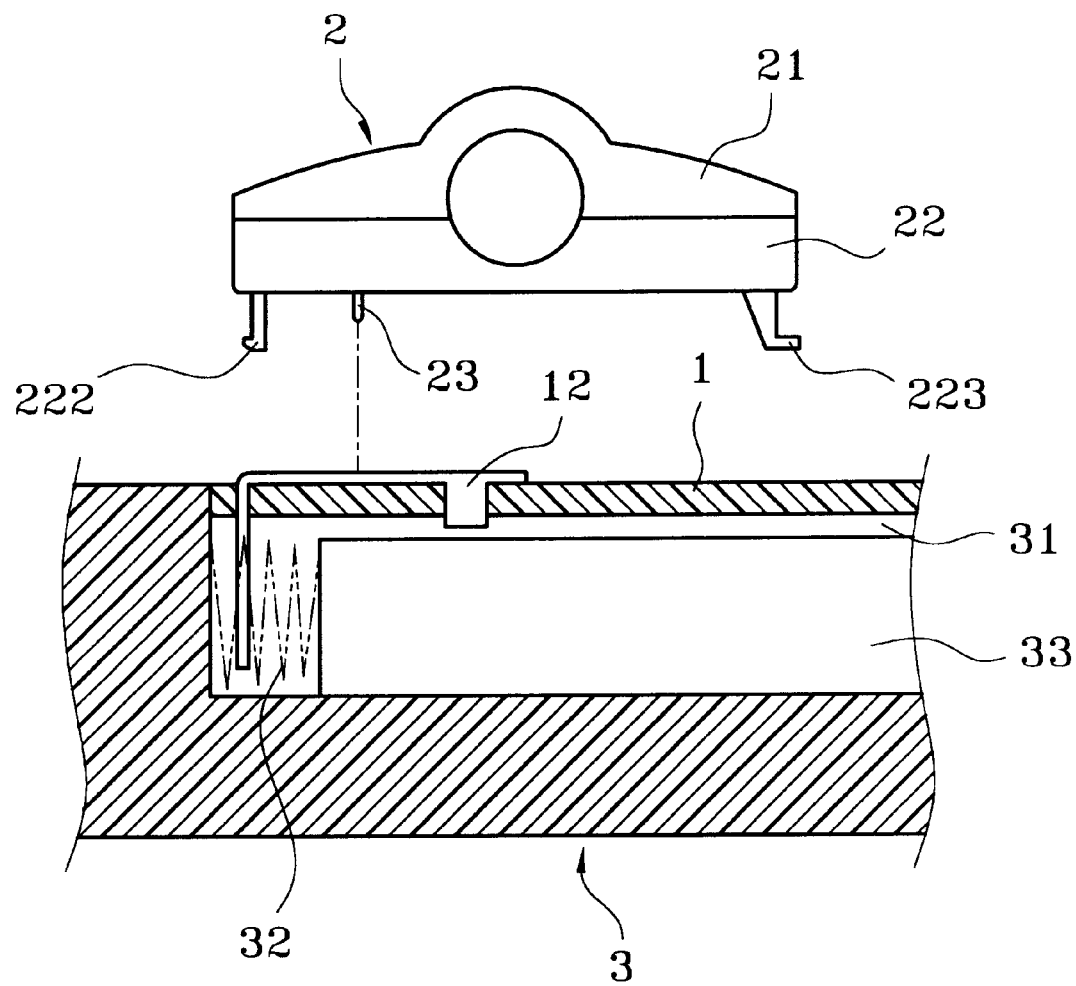
FIG. 3 is a schematic cross sectional view along line A—A of the present invention.

Further, referring to FIGS. 2 and 3, the use of the present invention is illustrated. FIG. 2 is a cross sectional view along line A—A. As shown in the figures. When the portable electronic mainframe 3 is installed with a battery 33 and then the upper cover 1 covers thereon. By arranging the buckling portion 14 and 15 to be arranged behind the battery seat 31, the elastomers 12 and 12' of the battery cover 1 will be in contact with the conductive portion 32 of the battery seat 31 so that the elastomers 12 and 12' are conductive with the conductive portion 32. After the power of the battery 33 is exhausted, the user engages the plug-in power source seat 2 to the buckling hole of the battery cover 1 with the buckling portions 222 and 223. Then, the two power output joints 23 and 24 of the plug-in power source seat 2 are in contact with the elastomers 12 so that the power connecting wire 25 connected to the external power guides power into the elastomers 12 and 12' through the power output joints 23 and 24 and then is transferred to the conductive portion 32 so that the portable electronic mainframe 3 may be connected to an external power source and is charged by the external power. Moreover, if no battery is installed in the portable electronic mainframe 3, the portable electronic mainframe 3 remains to acquire power due to the conduction of the two power output joints 23 and 24 and the elastomers 12 and 12' with the conductive portion 32.

Figure 4:
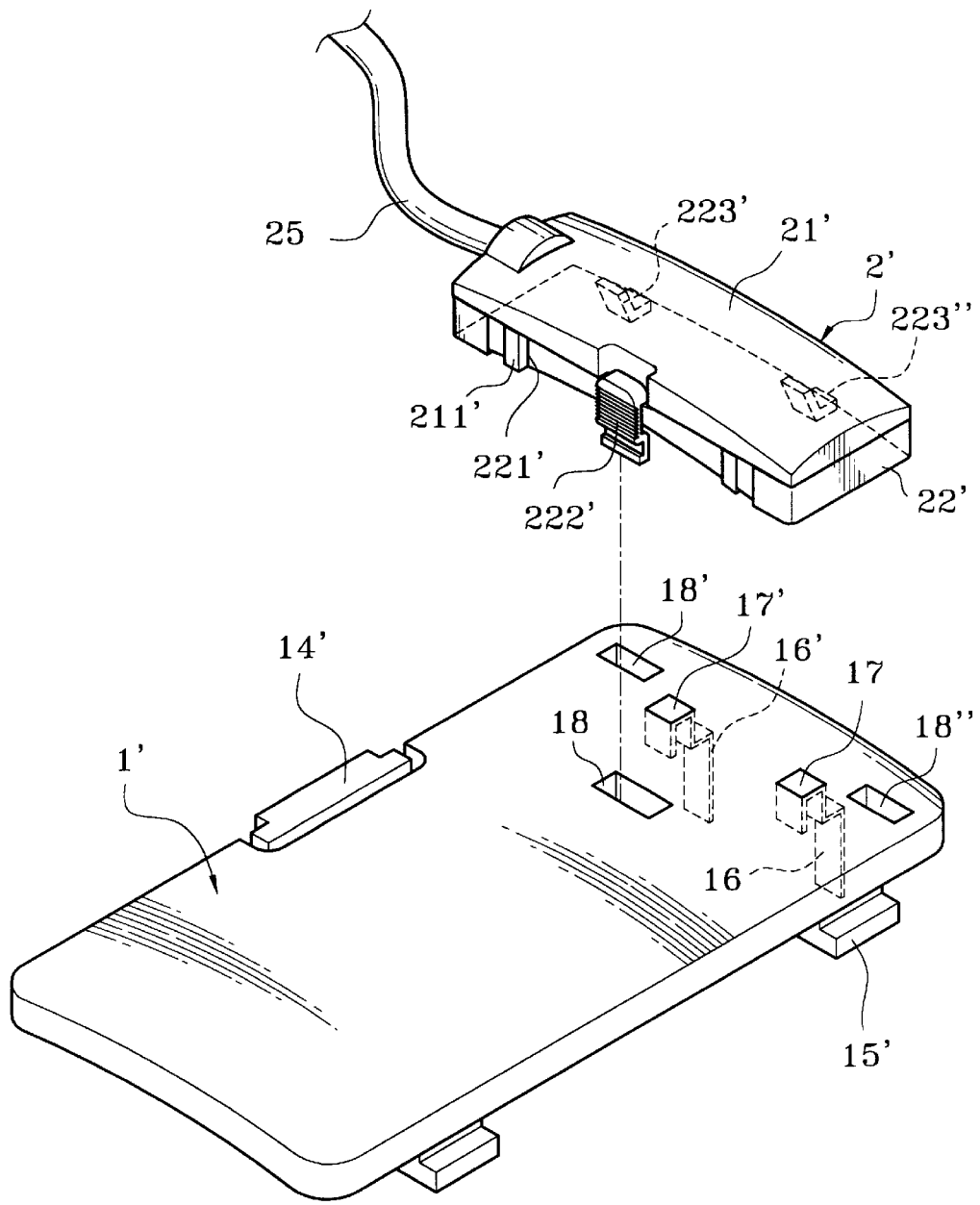
FIG. 4 is a schematic view showing one embodiment of the present invention.

Referring to FIG. 4, a schematic view of the embodiment according to the present invention is illustrated. As shown in the figures, the plug-in charging battery module may be made as different forms according to the type of the portable electronic mainframe. For example, a battery cover 1' is installed with a plurality of buckling holes 18, 18', 18" and receiving grooves 17 and 17' of a plurality of elastomers 16 and 16'. The periphery of the battery cover 1' is installed with a plurality of buckling portions 14' and 15'.

A plug-in power source seat 2' is formed by an upper cover 21' and a lower cover 22'. A plurality of buckling portions 211' capable of being coupled to the slot 221' of the lower cover 22' is installed at a proper place of the upper cover 21'. The plug-in power source seat 2' is installed with a power connecting wire 25 for being connected to the external power. Moreover, the lower cover 22' can be installed with a plurality of buckling portions 222', 223', 223" for being coupled to various portable electronic mainframe.

It will also be appreciated that other modifications and variations may be made to the embodiments as described and illustrated within the scope of the present application as defined in the following claims.

What is claimed is:

1. A plug-in charging battery module being arranged at the external portion of a portable electronic mainframe; the plug-in charging battery module comprising:

a battery cover being installed with a plurality of buckling holes and receiving grooves with elastomers;

a plug-in power source seat having an upper cover and a lower cover, and installed with two power output joints, which are arranged on the buckling hole of the battery cover;

wherein by the aforesaid construction, the portable electronic mainframe can be charged and used at the same time; moreover, as being charged, no battery is necessary to be detached.

2. The plug-in charging battery module as claimed in claim 1, wherein the periphery of the battery cover is installed with a plurality of buckling portions.

3. The plug-in charging battery module as claimed in claim 1, wherein the plug-in power source seat is installed with a power connecting wire for being connected to a external power source.

4. The plug-in charging battery module as claimed in claim 1, wherein an electronic element, such as a transformer or a rectifier, is added to the connection between the power connecting wire and the external power source.

5. The plug-in charging battery module as claimed in claim 1, wherein a plurality of buckling portions is installed at the upper cover, a plurality of slots capable buckled to the buckling portions are installed at a periphery of the lower cover.

6. The plug-in charging battery module as claimed in claim 1, wherein the lower cover is be installed with a plurality of buckling portion.

* * * * *